Nov. 6, 1928.   1,690,923
C. W. BUTLER ET AL
PUMP
Filed Dec. 14, 1925    2 Sheets-Sheet 1
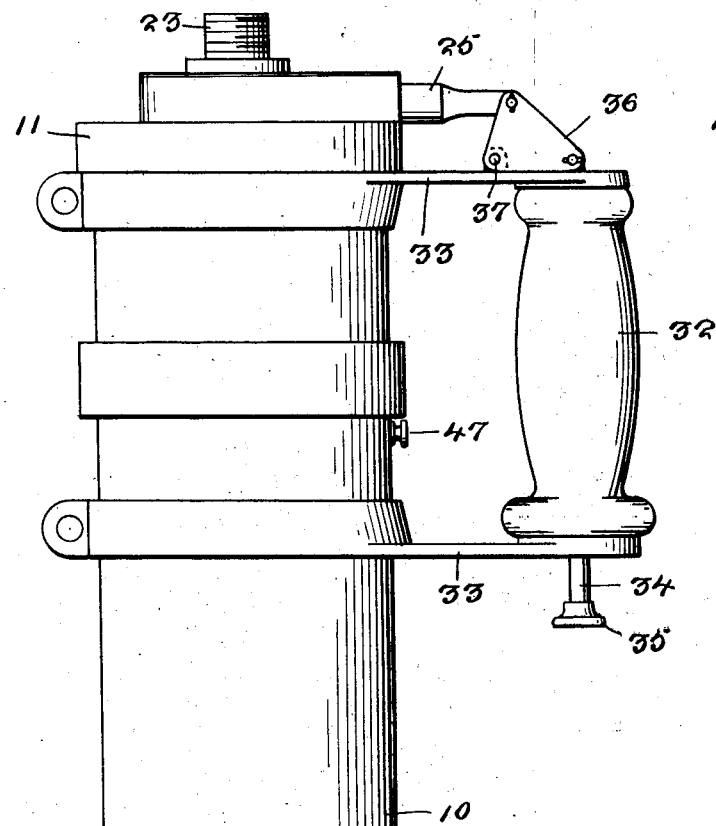
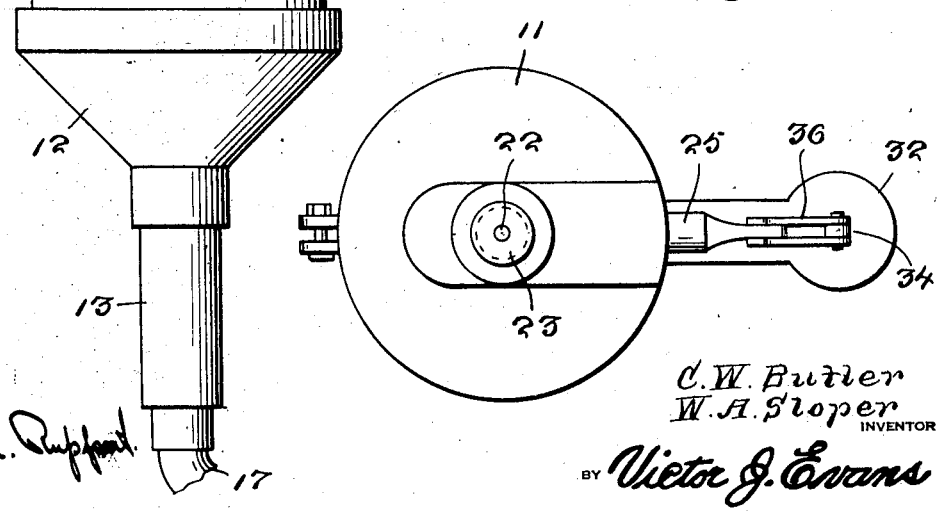
C. W. Butler
W. A. Sloper
INVENTOR
BY Victor J. Evans
ATTORNEY
WITNESS:

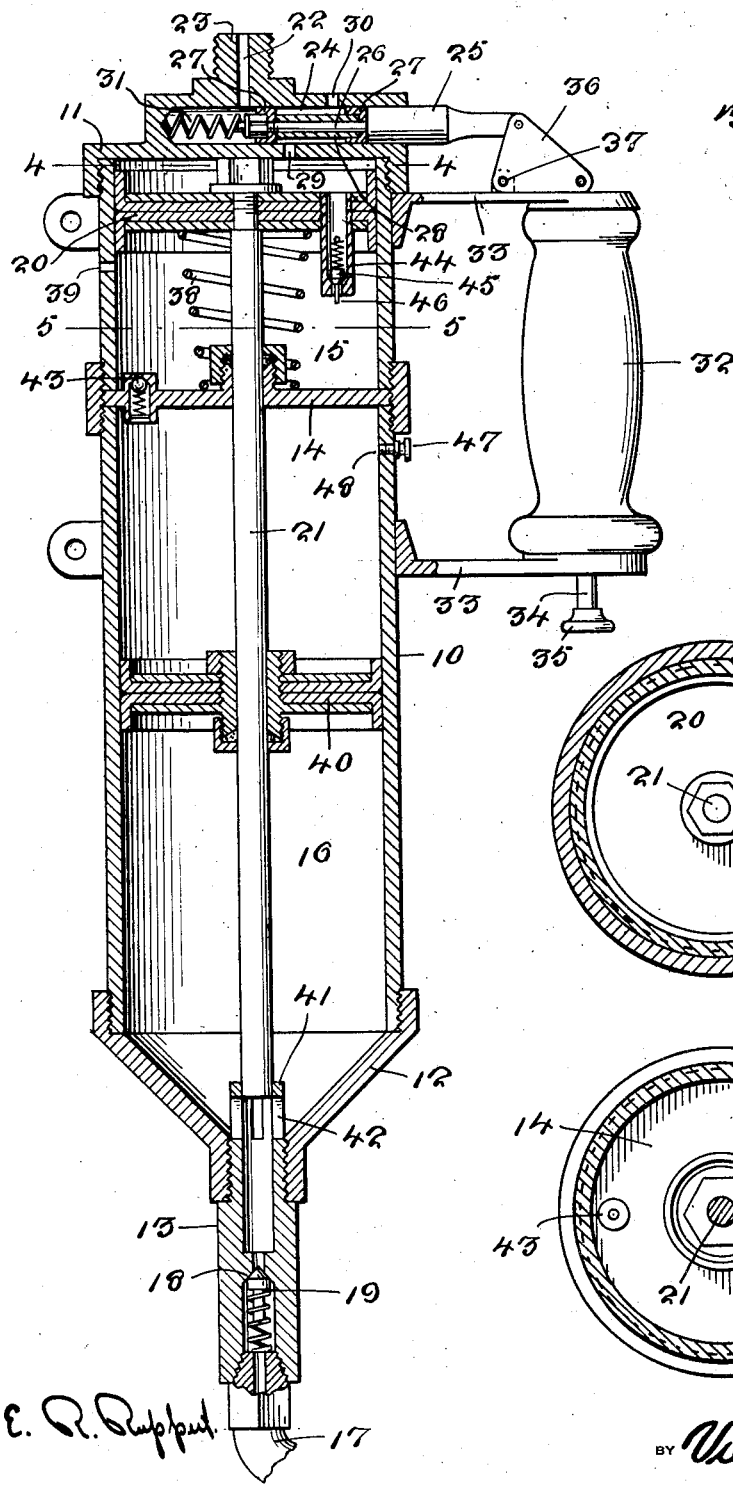

Patented Nov. 6, 1928.

1,690,923

UNITED STATES PATENT OFFICE.

CHANCEY W. BUTLER AND WILLARD A. SLOPER, OF INDEPENDENCE, OREGON, ASSIGNORS OF ONE-THIRD TO CHESTER O. SLOPER, OF INDEPENDENCE, OREGON.

PUMP.

Application filed December 14, 1925. Serial No. 75,402.

This invention relates to air operated lubricating pumps primarily intended for use in filling grease cups on automobiles, and other parts thereof where a high pressure is required, although its general application is contemplated by the claims.

In carrying out the invention we provide a pump including a nipple from which lubricant is forced upon each operation of the pump, together with a novel construction of means for automatically recharging the nipple after each operation of the pump, the latter being of novel construction and capable of being easily and conveniently handled for the purposes intended.

The nature and advantages of the invention will be better understood when the following detailed description is read in connection with the accompanying drawings, the invention residing in the construction, combination and arrangement of parts as claimed.

This application is a continuation in part of applicants' prior abandoned application, Serial Number 9,652, filed February 16th, 1925.

In the drawings forming part of this application, like numerals of reference indicate similar parts in the several views, and wherein:

Figure 1 is a view in elevation of a pump constructed in accordance with the present invention.

Figure 2 is a top plan view.

Figure 3 is a vertical sectional view through the pump.

Figure 4 is a sectional view on line 4—4 of Figure 3.

Figure 5 is a sectional view on line 5—5 of Figure 3.

Referring to the drawings in detail, 10 indicates a cylinder which is closed at its upper end by a cap 11, and at its lower end by a substantially cone-shaped cap 12, from which depends a nipple 13. This cylinder 10 is divided by a partition 14 to provide an air chamber 15 and a lubricant chamber 16, the nipple 13 communicating with the latter and adapted to be filled with lubricant therefrom in the manner to be hereinafter described. The nipple 13 is adapted to be coupled with a flexible tube 17 which in turn is connected with the part of the machinery to be lubricated. This nipple 13 is further formed with a valve seat 18 which is normally engaged by a spring pressed valve 19 to prevent any back flow of lubricant through the nipple incident to the operation of the pump in a manner to be hereinafter described.

Arranged to operate within the air chamber 15 is a piston 20 of any suitable construction, and depending from this piston is a piston rod 21 which slides through the partition 14 and also into the nipple 13, this piston rod serving in the capacity of a plunger for forcing the lubricant from the nipple into the flexible tube 17. The piston is actuated by compressed air admitted into the chamber 15 from any suitable source through the port 22 formed in a nipple 23 adapted to be coupled with a suitable compressed air supply pipe, as will be readily understood. The cap 11 is provided with a transverse bore 24 which slidably receives a valve for controlling communication between the port 22 and the air chamber 15. This valve may be of any desired construction but preferably includes a body portion 25 from one end of which projects a reduced stem 26, the latter supporting spaced washers 27 which are maintained in the position shown in Figure 1 by a spacing sleeve 28. The cap is also provided with an inlet port 29 and an outlet port 30, while the valve in its entirety is normally maintained in a closed position through the instrumentality of a spring 31 arranged within the transverse bore 24 of said cap. The pump is provided with a handle 32 supported by brackets 33, and slidable through this handle is a valve operating rod 34 supporting a thumb engaging element 35 at the lower end thereof. The upper end of this rod 34 is connected with the body portion 25 of the valve by means of a link 36, the latter being pivoted as at 37 upon the adjacent bracket 33 for the handle, as shown. Consequently, when the rod 34 is moved through the handle 33 in one direction, the valve 25 is opened against the tension of the spring 31, thereby allowing compressed air to enter through the port 22, around the spacing sleeve 28, and through the port 29 into the air chamber 15, operating the piston 20, and simultaneously moving the piston rod 21 through the nipple 13 in a manner to force the lubricant from the nipple through the flexible tube 17. The piston 20 is thus operated against the tension of a spring 38, so that when the valve is closed by the spring 31, incident to the release of the operating rod 34, the spring 38 returns the piston 20 to its normal position. During the return movement of the piston 20, the air arranged in the space between the piston 20 and the cap 11 is forced from the chamber through the port 29 around the spacing sleeve 28 and then through the outlet port 30 above referred to. After the piston has returned to the position shown in Figure 1, whatever air remains in the space between the piston and the partition 14 finds its way to the atmosphere through the port 39 before the pump is again operated.

Slidably mounted upon the piston rod 21 and in the lubricant chamber 16 is a follower 40 which is constantly subjected to air pressure for the purpose of moving the follower against the contents of the chamber 16 to maintain the nipple 13 loaded with lubricant. This nipple is provided with a guide 41 for the piston rod 21, the guide projecting within the chamber 16 and having slots or passages 42 through which lubricant is forced into the nipple by the follower 40 in a manner to be presently described. The partition 14 is provided with a normally closed spring pressed check valve 43 which controls communication between the air chamber 15 and the lubricant chamber 16, and is opened to admit a certain portion of the compressed air admitted into the cylinder to pass into the chamber 16 so as to maintain the follower 40 under a constant pressure for the purpose above stated. Depending from the piston 20 is a valve casing 44 provided with a normally closed spring pressed valve 45 including a stem 46 which projects an appreciable distance beneath the lower end of the casing 44. Now, when air is admitted into the chamber 15 above the piston 20 it forces the latter downwardly to operate the piston rod 21 for the purpose above mentioned, but due to the arrangement of the valve casing 44 and the valve 45, the stem 46 of the latter strikes the partition 14 to open the valve 45, and thereby allow a portion of the compressed air above the piston to pass through the valve casing 44 beneath the piston to cushion the downward movement of the latter and thereby eliminate shocks and jars incident to the operation of the pump. This air that passes from the top of the piston into the space beneath the latter has sufficient pressure to open the valve 43 incident to the downward movement of the piston 20, thereby allowing a sufficient amount of air under pressure to pass from the chamber 15 into the chamber 16. With each operation of the pump the quantity of air admitted to the chamber 16 is increased, so as to always maintain a constant pressure on the follower 40 for the purpose specified. As a matter of fact, the opening of the valve 45 takes place just prior to the piston 20 reaching the limit of its downward movement, whereupon the spring 38 functions to automatically return the piston 20 and its rod 21 to normal positions. As the rod 21 moves to its normal position it uncovers the slots 42 of the guide 41, thereby allowing the follower 40 which is being moved downwardly in the chamber 16, while the piston is being moved upwardly in the chamber 15, to force lubricant from the chamber 16 into the nipple 13. In this manner the nipple is always charged with a quantity of lubricant to be readily and quickly projected therefrom upon the next operation of the pump.

When it is desired to re-fill the chamber 16 the cap 12 is removed from the lower end of the cylinder, and the follower 40 moved upwardly on the piston rod 21 to a position in close proximity to the partition 14, and by removing the plug 47 from the cylinder, the air confined in the space between the follower and the partition 14 is allowed to escape to the atmosphere through the port 48. The pump in its entirety is very simple in construction, easy to manipulate, positive in operation, and can be quickly moved from place to place and attached to different parts of the automobile to be lubricated.

While it is believed that from the foregoing description the nature and advantages of the invention will be readily apparent, we desire to have it understood that we do not limit ourselves to what is herein shown and described, and that such changes may be resorted to when desired as fall within the scope of what is claimed.

Having thus described the invention, what is claimed as new, is:—

1. A lubricating pump of the character described comprising a cylinder divided into an air chamber and a lubricant chamber, a nipple communicating with the last named chamber, an air actuated piston including a piston rod slidable within said nipple and serving as a plunger to force the lubricant therefrom, a valve controlling admittance of air under pressure into said air chamber, a normally seated check valve in said nipple, and means actuated by said air for filling said nipple with lubricant during the return of said piston rod to its normal position.

2. A lubricating pump of the character described comprising a cylinder divided to provide an air chamber and a lubricant chamber, a nipple communicating with the last named chamber, an air actuated piston arranged in said air chamber, means controlling the admittance of air under pressure into said chamber to operate the piston in one direction, and provide for the escape of said air upon movement of the piston in a reverse direction, a piston rod slidable through the cylinder into said nipple and serving as a plunger to force lubricant from the latter, a normally seated check valve arranged in said nipple, means actuated by said air for filling said nipple with lubricant during the return of said piston and rod to their normal position, and means for admitting air from one side of the piston to the other to cushion the downward movement of the piston under the influence of air.

3. A lubricating pump comprising a cylinder, a partition dividing the cylinder into an air chamber and a lubricant chamber, an air actuated piston arranged to operate in the air chamber, a nipple projecting from the other end of the cylinder and communicating with the lubricant chamber, a piston rod carried by the piston slidable in said nipple to force the lubricant therefrom, a cap closing the upper end of said cylinder and having an air inlet port, and a transverse bore communicating with said pump, and air outlet ports, a valve slidable in said bore for controlling said ports, a handle supported by the cylinder, a valve operating rod slidable through said handle, means carried by said piston for admitting air from one side of the piston to the other to cushion the movement of the piston in one direction, and air actuated means for filling said nipple with lubricant during the return movement of the piston and rod to their normal position.

4. A lubricating pump of the character described comprising a cylinder, a partition dividing the cylinder into an air chamber and a lubricant chamber, an air actuated piston arranged in the air chamber, means for controlling the admission of air under pressure into said chamber to operate the piston, a nipple projecting from the other end of the cylinder and communicating with the lubricant chamber, a piston rod carried by the piston and slidable in said nipple to force the lubricant therefrom, a check valve in said nipple, a follower slidable on said rod and arranged within the lubricant chamber, and means for admitting air from the air chamber into said lubricant chamber upon each operation of the pump, whereby said follower is subject to constant pressure and operated to refill the nipple during the return movements of the piston and rod to their normal position.

5. A lubricant pump of the character described comprising a cylinder, a partition dividing the cylinder into an air chamber and a lubricant chamber, an air operated piston arranged in the air chamber, a nipple projecting from the other end of the cylinder and communicating with the lubricant chamber, a piston rod carried by the piston and slidable in said nipple to force the lubricant therefrom, means for controlling the admission of air under pressure into said air chamber to operate the piston in one direction, means for returning the piston to normal position after each operation, a valve carried by the piston and cooperating with said partition to admit air from one side of the piston to the other and thereby cushion the movement of the piston on its active stroke, a follower slidable on said rod and arranged in the lubricant chamber, a normally closed valve associated with said partition and operable upon each operation of the piston to admit air from the air chamber onto said follower, thereby maintaining the latter under pressure, said follower being operable to refill said nipple during the return movement of the piston and said rod to their normal position, and a check valve arranged in said nipple.

6. A grease gun comprising a cylinder, a plunger therein for ejecting grease therefrom, a piston in said cylinder for operating the plunger and a cylindrical portion adapted to receive the plunger to eject grease and to receive grease by suction as the plunger is withdrawn therefrom, said portion receiving grease by way of the opening therein through which the plunger passes, and a loose piston slidably mounted on the plunger and co-operating with said plunger to push grease toward the point of ejection.

In testimony whereof we affix our signatures.

CHANCEY W. BUTLER.
WILLARD A. SLOPER.